(12) United States Patent
Rosen (10) Patent No.: US 8,397,766 B2
(45) Date of Patent: Mar. 19, 2013

(54) PIPE FOR TRANSPORTING A MEDIUM AND METHOD FOR MANUFACTURING A PIPELINE

(75) Inventor: Hermann Rosen, Kastanienbaum (CH)

(73) Assignee: Rosen Swiss AG, Stans (CH)

( * ) Notice: Subject to any disclaimer, the term of this patent is extended or adjusted under 35 U.S.C. 154(b) by 814 days.

(21) Appl. No.: 12/605,397

(22) Filed: Oct. 26, 2009

(65) Prior Publication Data

US 2011/0094613 A1 Apr. 28, 2011

(51) Int. Cl.
*F16L 9/22* (2006.01)
(52) U.S. Cl. .......... 138/155; 138/98; 285/55; 285/288.1
(58) Field of Classification Search ............. 138/98, 138/155; 285/55, 288.1
See application file for complete search history.

(56) References Cited

U.S. PATENT DOCUMENTS

| 3,862,771 A * | 1/1975 | Schwarz | 285/54 |
| 3,993,331 A * | 11/1976 | Schwarz | 285/53 |
| 2002/0038954 A1* | 4/2002 | Andreoli | 285/288.1 |
| 2004/0070199 A1* | 4/2004 | Trivelli | 285/55 |

FOREIGN PATENT DOCUMENTS

DE 2834538 A * 2/1980

* cited by examiner

*Primary Examiner* — Patrick F Brinson
(74) *Attorney, Agent, or Firm* — Gudrun E. Huckett (57) ABSTRACT

A pipeline has a first pipe and a second pipe welded together by a weld seam, wherein the first and second pipes each have an inner side with a lining section of plastic material for protecting an inner side of the pipeline. The lining sections end at a spacing from the weld seam. The lining section of the first pipe abuts the lining section of the second pipe such that by an undercut provided on at least one of the lining sections a fill space is formed in a circumferential direction of the pipeline.

14 Claims, 8 Drawing Sheets

PIPE FOR TRANSPORTING A MEDIUM AND METHOD FOR MANUFACTURING A PIPELINE

BACKGROUND OF THE INVENTION

The present invention concerns a pipeline for transporting a medium, in particular a liquid with abrasive solid particle contents, for example, sludge, comprising a lining comprising plastic material for protecting an inner side of the pipeline, wherein the pipeline comprises pipes welded together that are provided on their inner side with at least one lining section arranged at a spacing from the weld seam. Moreover, the invention concerns a method for producing a pipe with a lining that is suitable for transporting in particular liquids having an abrasive solid particle contents wherein for constructing the pipeline individual pipes are butt welded together and the pipes are provided with lining sections comprising a plastic material, wherein the lining sections are spaced from a pipe end.

Abrasive liquid/solid mixtures are transported often in a pipeline or conduit that is provided with a lining, i.e., an inner protective coating. This protection serves, on the one hand, for mechanical loading of the, particularly, metallic inner side of the pipeline wall as well as for preventing corrosion of the pipeline wall. As an alternative, and/or as a supplement, the lining serves the lining can also serve as a protection of a corrosion coating that may be applied onto the metallic inner side of the pipeline.

When welding the pipeline from individual pipes heat is produced that will propagate toward the pipe member. A lining that is comprised of plastic material or a lining section of a pipe however may be loaded only up to a certain temperature with thermal energy. This depends on the coating material and the application method. When the temperatures are too high, the coating material can be negatively affected with respect to its properties up to the point of reduced adhesion of the lining on the inner side of the pipe, preferably consisting of steel, or of complete destruction of the lining. It is therefore known to not extend the lining to the end of the pipe but to leave a so-called "cutback". This area, after welding of the pipes has taken place, must be post-coated. The post-coating is especially difficult in case of thicker wear-resistant plastic linings with a thickness of, for example, 20 mm to 50 mm in the radial direction.

The post-coating of the area that has been spared is enabled by introducing a sleeve into the interior of the pipeline that extends from one lining section to the next, and by filling the space that is now closed off. Subsequently, the sleeve is left within the pipeline which negatively affects the inner pipeline cross-section. Because of connecting locations relative to the weld seam positioned at both ends of the sleeve and in need of sealing, these pipelines often have leaks that may extend to the weld seam and that, already at the beginning of pipeline operations, may have a negative effect on the integrity of the pipeline as a result of the transported media.

It is therefore an object of the present invention to provide a pipeline and a method for producing a pipeline that is improved relative to the prior art.

The object is solved in regard to the pipeline in that at least one lining section of a first pipe rests on a lining section of a further pipe by forming an undercut such that in the circumferential direction of the pipeline a fill space is formed as well as by a method characterized in that, upon alignment of the pipes for welding, lining sections of the pipes rests against one another, wherein by an undercut at least one lining section forms a fill space that after welding is filled with a fill material that in situ will cure and/or will be cured. Advantageous embodiments of the invention can be taken from the dependent claims as well as from the description.

A pipeline according to the invention for transporting a medium, in particular a liquid with abrasive solid particle contents has at least one lining section of a first pipe that rests on a lining section of a further pipe by forming an undercut such that in the circumferential direction of the pipe or the pipeline a fill space is formed.

In a method according to the invention for producing a pipeline with a lining, preferably a pipeline as disclosed above or as described in the following, individual pipes are butt welded together for constructing the pipeline, wherein the pipes each are provided with at least one lining section comprising plastic material which lining section is spaced from the pipe end. Upon alignment of the pipes for welding a lining section is designed such that by means of an undercut a fill space is formed which, after welding, is filled with a filler material that in situ will cure and/or will be cured. Pipes that abut end on end have in general identical longitudinal center axes, independent of the abutting edges of the pipe walls that, for example, as a result of beveling, may extend at a slant to one another.

The lining sections of two neighboring pipes are therefore directly abutting one another so that a fill space is produced that at least section-wise, in particular however completely, is separated relative to a free pipeline interior, i.e., is inwardly closed. Into this fill space, by omitting sleeves to be introduced into the interior of the pipeline, a filler material can be introduced. Producing a pipeline for transporting abrasive mixtures is thus simplified. At the same time, it can be ensured that the abrasion-resistant lining sections continue in constant quality across the length of the pipeline. Complex pipe couplings with which the same result can be achieved are not needed.

As a lining or thicker coating of an inner side of a pipeline preferably an organic polymer, in particular polyurethane, is to be used that with regard to properties can be matched to the media to be transported. For example, between the inner side of the pipeline and the coating, a corrosion protection layer and/or an adhesion promoter or an adhesive that improves the connection of actual lining and the inner side of the pipeline to be protected may be applied. The inner side of the pipeline is constituted in this way, for example, of the metallic or additionally coated inner sides of the pipe walls of the individual pipes. In particular after filling in the fill space with a material that is identical to the material of the lining section a continuous identical lining of the pipeline is provided. The properties of the sealing and/or abrasion-inhibiting material are continuously assessable.

Inasmuch as the fill space of the pipeline is to be filled, an undercut is advantageous that has a profile that is suitable for producing a positive-locking connection. Even in case of undesirable detachment of the lining from an inner side of the pipe wall, caused by unsatisfactory adhesion, at least in the longitudinal direction of the pipeline forces that are produced in the lining can be better transmitted by a lining section even across the fill space.

A pipeline according to the invention is furthermore improved when the two lining sections abutting one another have sections that overlap one another, viewed in the longitudinal direction of the pipe. Overlap existing in the radial direction of the inner linings resting on one another increases the contact surface which, in turn, leads to a greater seal-tightness of the fill space relative to the interior of the pipeline.

Preferably, the inner pipeline cross-section at the transition from one pipe to a further pipe connected by welding is substantially constant. Substantially constant means in this context that the inner pipeline section has no deviations that surpass the conventional manufacture-caused tolerances. The pipeline cross-section is not reduced by sleeves that are permanently installed in the pipeline.

Advantageously, the weld seam of a pipeline is limited at the inner side of the pipeline by a root protection that in particular may be integrated into a support ring or a sleeve that then also serves for centering the pipes relative to one another. A root weld protection serves moreover for protecting the lining from weld spatter and provides a flawless root weld.

Advantageously, the fill space after welding is filled in, in particular, the fill space is filled by means of at least one opening provided in a wall of the pipeline, in particular of a pipe, so that no complex devices must be introduced into the pipeline. The openings after filling are to be closed and secured.

The undercut of at least one lining section is advantageously formed by use of a correspondingly embodied cap during centrifugal casting of the pipe for producing the lining section. The use of identical undercuts that adjoin one another at least at the contacting faces of the two pipes reduces the manufacturing expenditure and the possibility of positioning two pipes that have lining sections that, with respect to their profiles, do not match one another, which in situ would lead to significant delays. Advantageous is at least one pipeline in which the fill space is formed by undercuts of both participating lining sections.

The connecting location between two pipes is further improved when an adhesion promoter is applied to the undercut between the fill space and the lining section.

The manufacturing method according to the invention is further improved when the fill space and/or at least one lining section is tempered preferably by induction after the welding step. Alternatively, or in addition to tempering by induction, resistance heating elements or infrared radiators can be employed, for example. A thermal after treatment can lead to a faster curing of the material introduced into the fill space.

Optionally, a support means that is preferably temporarily inserted into the pipeline may improve the formation of a continuous lining of the pipeline when this support means is arranged in the pipeline during welding and/or during filling and/or during a solidification process of the filler material. As a support means, a support ring can be used for a root weld seam, for example; otherwise also a support member, for example, an expander or a balloon. These means may also contain heating elements with which a curing process can be accelerated.

An additional heat dissipation can be realized during welding by means of a heat dissipating means, for example, a copper material, that is applied externally onto the pipeline. Moreover, purging with an inert gas can be realized during welding in particular by means of one or several openings introduced into the pipeline.

BRIEF DESCRIPTION OF THE DRAWINGS

Further advantages and details of the invention can be taken from the following figure description. The schematic illustrations show in.

DESCRIPTION OF PREFERRED EMBODIMENTS

Same or similarly acting parts are, if not otherwise indicated, identified with identical reference numerals. Individual technical features of the embodiments described in the following, in combination with the features of the afore described embodiments, may also lead to embodiments of the present invention.

Figure 1:
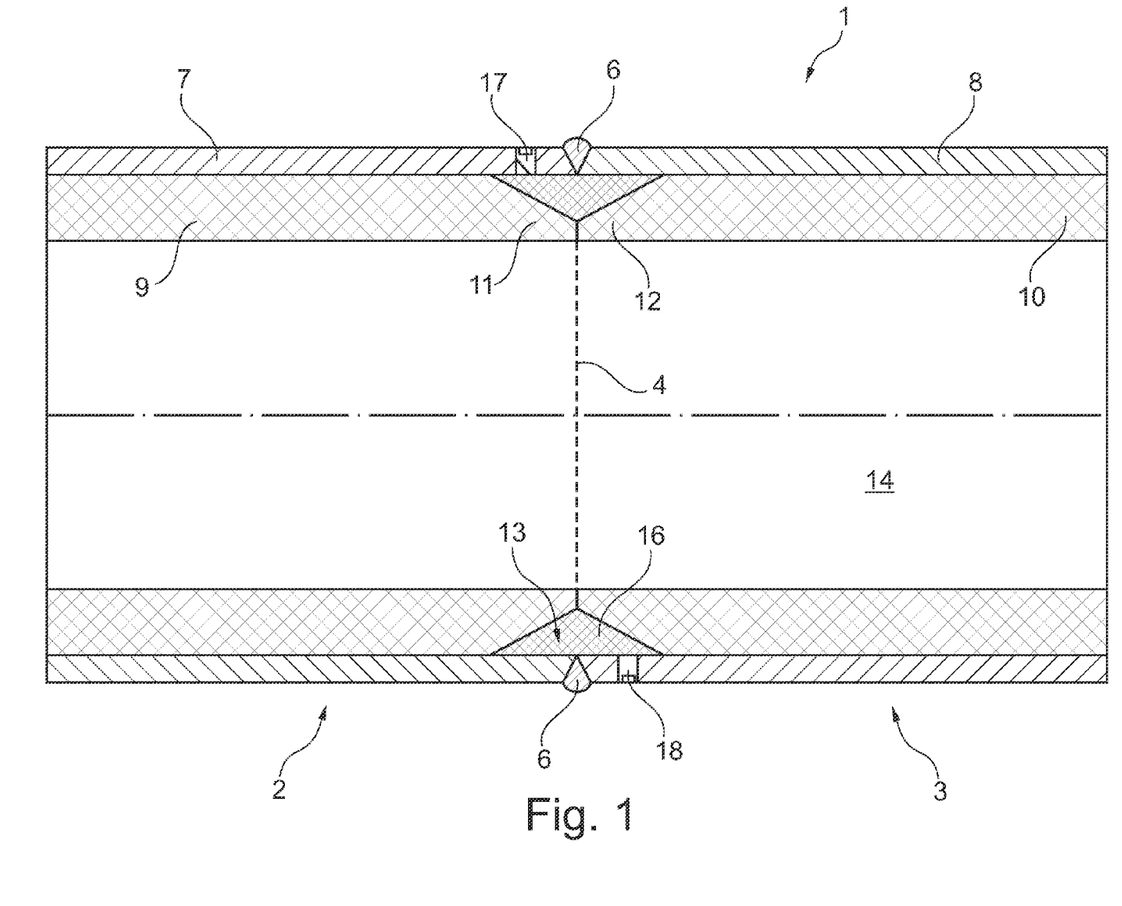
FIG. 1 the article of the present invention.

A pipeline 1 according to the invention comprises two pipes 2 and 3 that are resting against one another along a section plane 4 that is illustrated in dashed lines and is positioned perpendicularly to the plane of the drawing. Along this section plane 4 a weld seam 6 extends by means of which the two pipe walls 7 and 8 are connected to one another for forming a pipeline 1. The pipes 2 and 3 or their respective pipe walls 7 and 8 are provided at the inner side with lining sections 9 and 10 that are spaced from the weld seam 6 by means of an undercut. The two noses 11 and 12 of the lining sections 9 and 10 are resting against one another such that in the circumferential direction of the pipe 1 a fill space 13 is formed. By means of the noses 11 and 12 that abut one another this fill space is closed off relative to the free pipeline interior 14. The use of additional sleeves for building the fill space is therefore not required. Moreover, the diameter of the inner pipeline cross-section, aside from the material tolerances that occur, for example, upon centrifugal casting of the lining, is unchanged. The lining sections 9 and 10 and the filler material 16 that together form part of the lining of pipeline 1 are comprised substantially of the same plastic material. This plastic material is preferably an organic polymer, in particular, highly abrasion-resistant polyurethane is suitable for this purpose.

Openings are arranged in the pipe walls 7 and 8 which in this case are closed off, for example, by welded screw plugs 17 and 18. The openings can be, for example, arranged only in one pipe 2 or 3. After welding the two pipes 2 and 3, by means of one of the two openings, for example, the opening correlated with the plug 17 the filler material can be filled in. Through the opening that is closed off by the plug 18 venting of the fill space is then realized. The filler material can be filled in at the top side (relative to the ground) of the pipeline 1 in order to achieve gravity-caused flowing of the casting compound into the fill space 13. In particular, filling from below is however done in order to assist venting and to prevent air enclosures. In addition, underpressure can be generated by means of a venting device connected to the opening in order to reduce the risk of enclosed air/inert gas.

Figure 2:
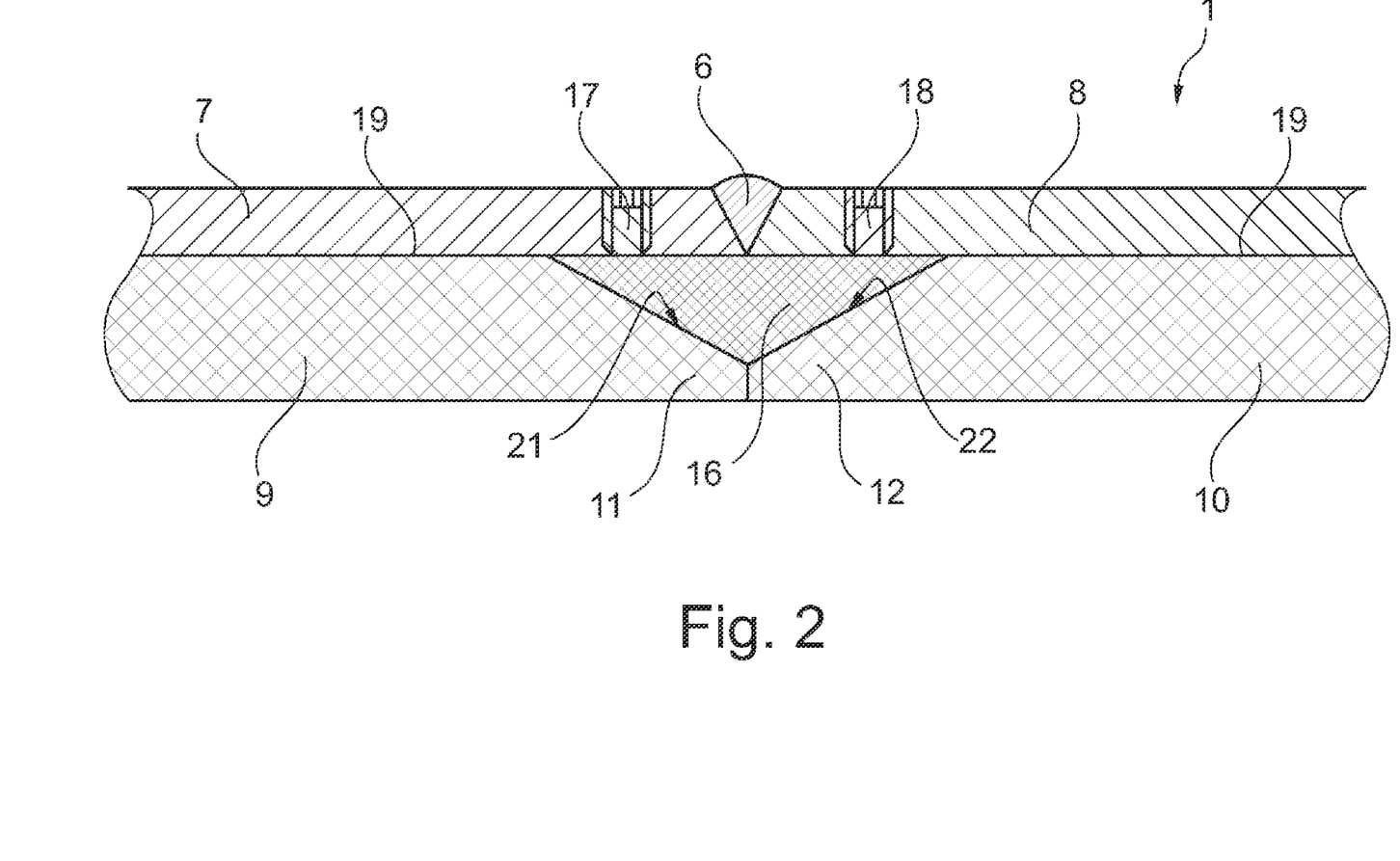
FIG. 2 a detail view of a further article of the present invention.

In the detail view of a further embodiment according to the invention according to FIG. 2, it can be seen that an adhesion promoter 19 is used between a pipe 2 and 3 and a lining section 9 and 10 which, in the area of the weld seam 6, does not extend all the way to the end of the respective pipes 2 and 3. This adhesion promoter 19 serves for improving adhesion between pipe walls 7 and 8 and the respective lining sections 9 and 10. Moreover, it also improves adhesion between the pipe walls 7 and 8 and the filler material 16. In addition, the adhesion promoter can also be arranged on the surfaces 21 and 22 of the noses 11 and 12; this is however not illustrated in FIG. 2.

Figure 3:
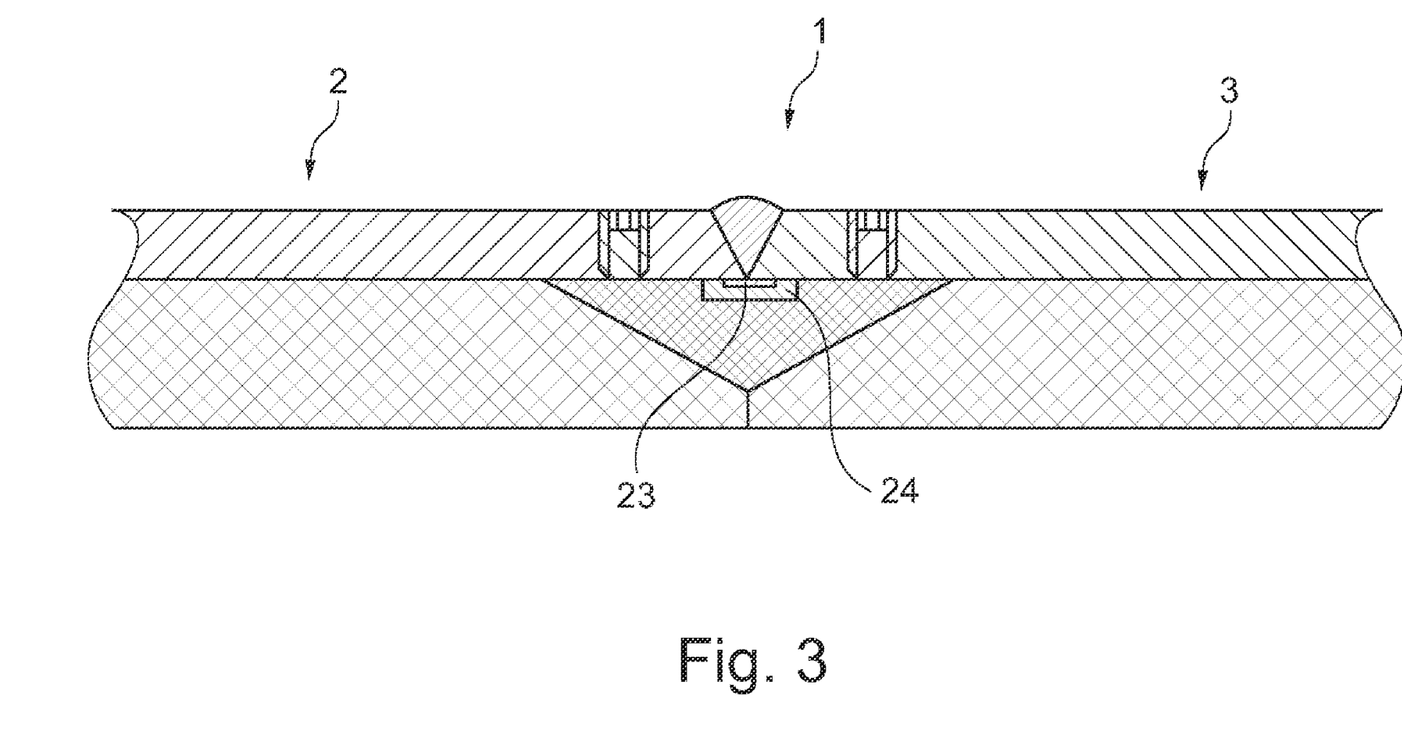
FIGS. 3-7 further embodiments of the invention.

In the embodiment according to FIG. 3 before welding a support ring 24 comprising a root weld protection 23 was introduced into the fill space 13 wherein the support ring at the same time serves as a centering means for the two pipes 2 and 3. The root weld protection 23 can be, for example, inserted in the form of an insert strip into the support ring 24. The latter, before butt joining the pipes 2 and 3, is introduced together with the root weld protection 23 into the fill space that is formed already partially by the undercuts or noses 11 or 12, subsequently the pipeline 1 is precisely connected. In order to provide an improved seat, the support ring can be pushed on with tension or can be attached to the inner side of the pipe with fastening means.

Figure 4:
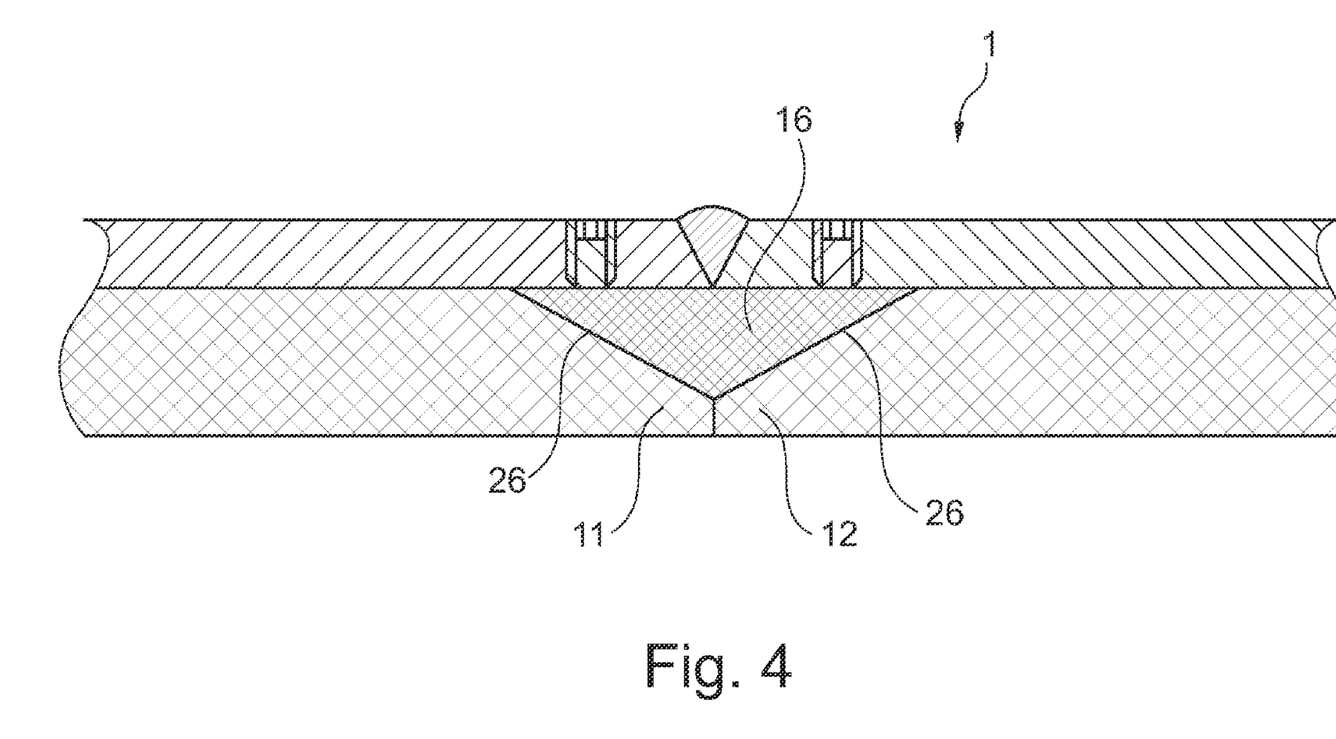

In the embodiment according to FIG. 4 the cavity is provided at the inner side with an adhesive layer 26 that improves the connection between filler material 16 and lining sections 9 and 10. Optionally, such an adhesive layer or adhesion promoter can also be introduced between the two abutting ends of the noses 11 and 12 which improves the connection of the two lining sections 9 and 10.

Figure 5:
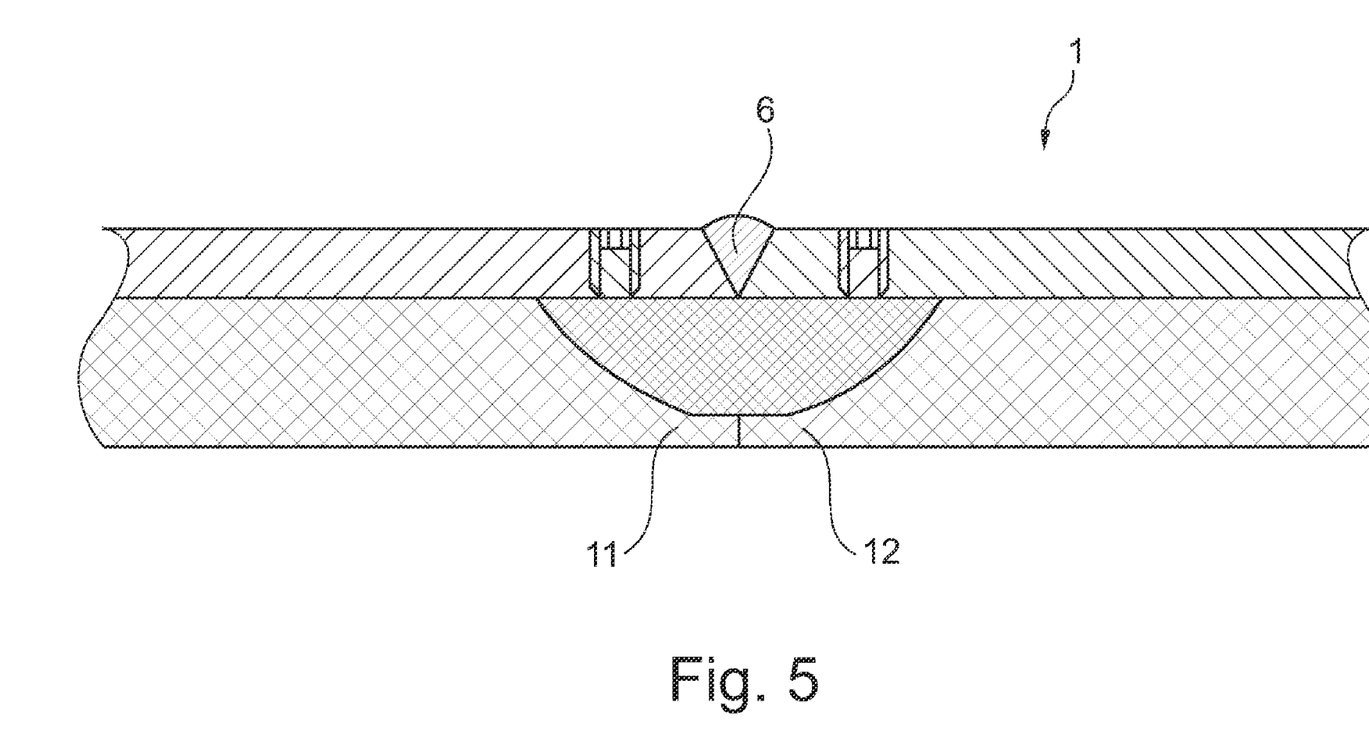

While the undercuts according to FIGS. 1 to 3 are straight profiled sections, the embodiment according to FIG. 5 is provided with a curved undercut. This improves additionally the durability of the employed material as a result of the approximately uniform spacing of the material of the lining sections 9 and 10 from the weld seam 6.

Figure 6:
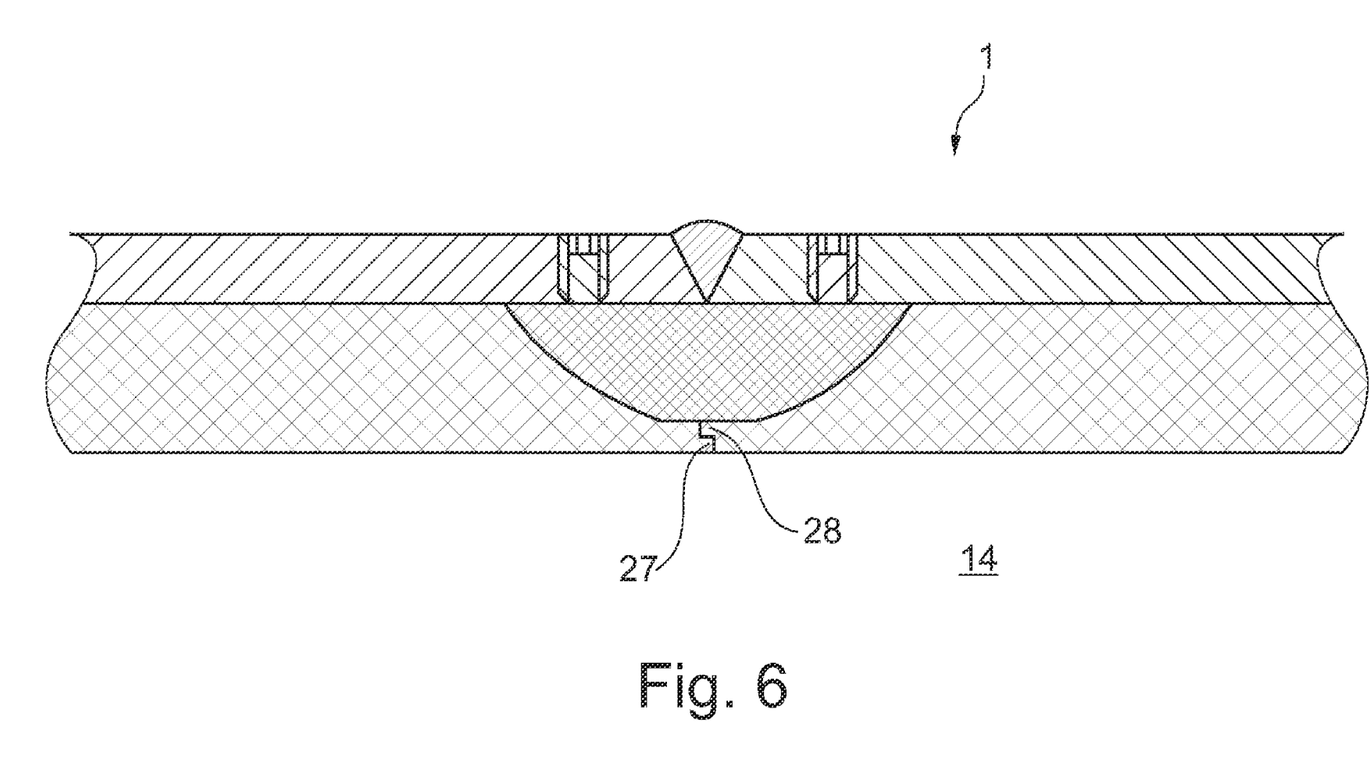

In addition, the embodiment according to FIG. 6 has lining sections 9 and 10 that in the longitudinal direction of the pipeline 1 have sections 27 and 28 overlapping one another. They serve for improving the seating action of the fill space 13 relative to the pipe interior 14 and, when using an adhesive between the sections 27 and 28, can moreover contribute to improved stability of the abutting edges of the lining sections 9 and 10.

Figure 7:
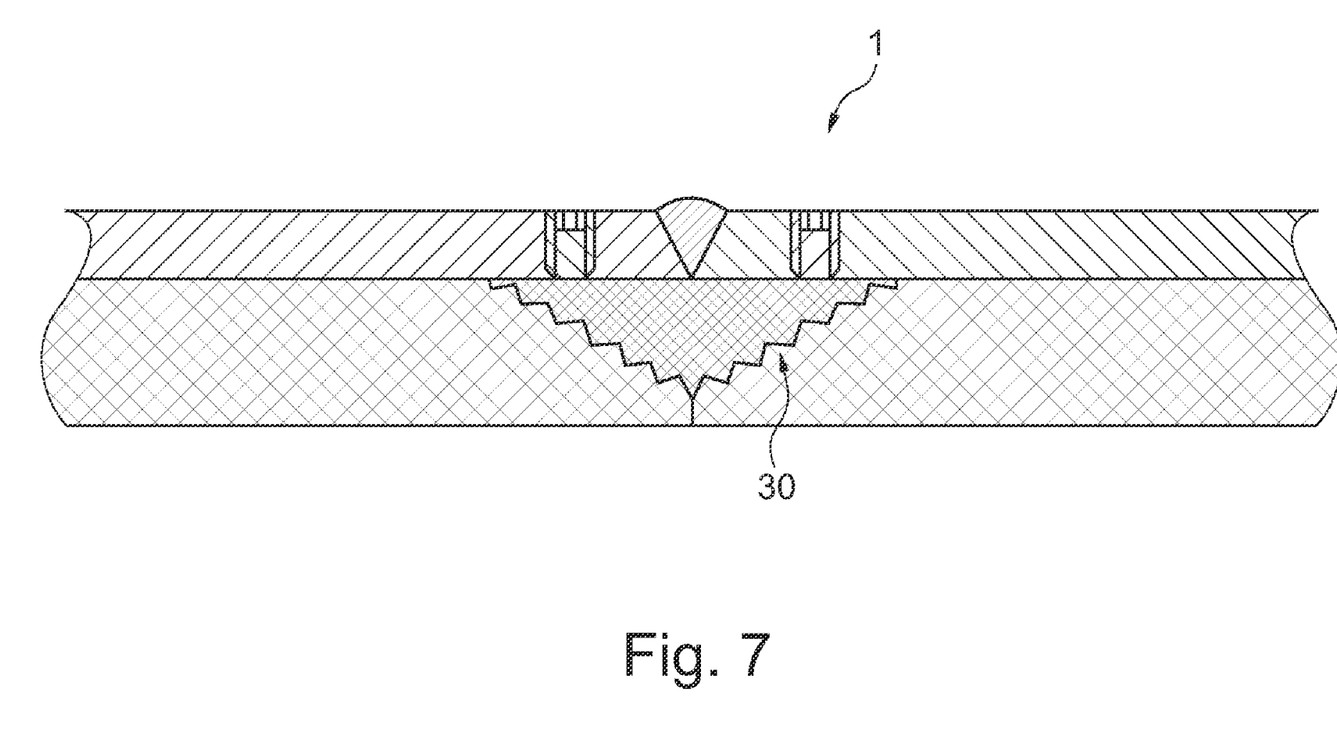

The fill space 13 as well as the undercuts can be embodied in almost any suitable profiling wherein in particular a profiling according to FIG. 7 provided with projections 30 leads to a positive-locking connection of the filler material 16 and the respective lining sections 9 and 10 (viewed in the longitudinal direction of the pipeline). In this way, the fill space is in an improved way an integral component of the lining of the pipeline 1.

The steps illustrated in FIG. 7 not only can be embodiment in a zigzag shape but also in the form of further, not necessarily but preferably, positive-locking connecting profiles wherein in particular spikes or edges are simply producible.

Figure 8:
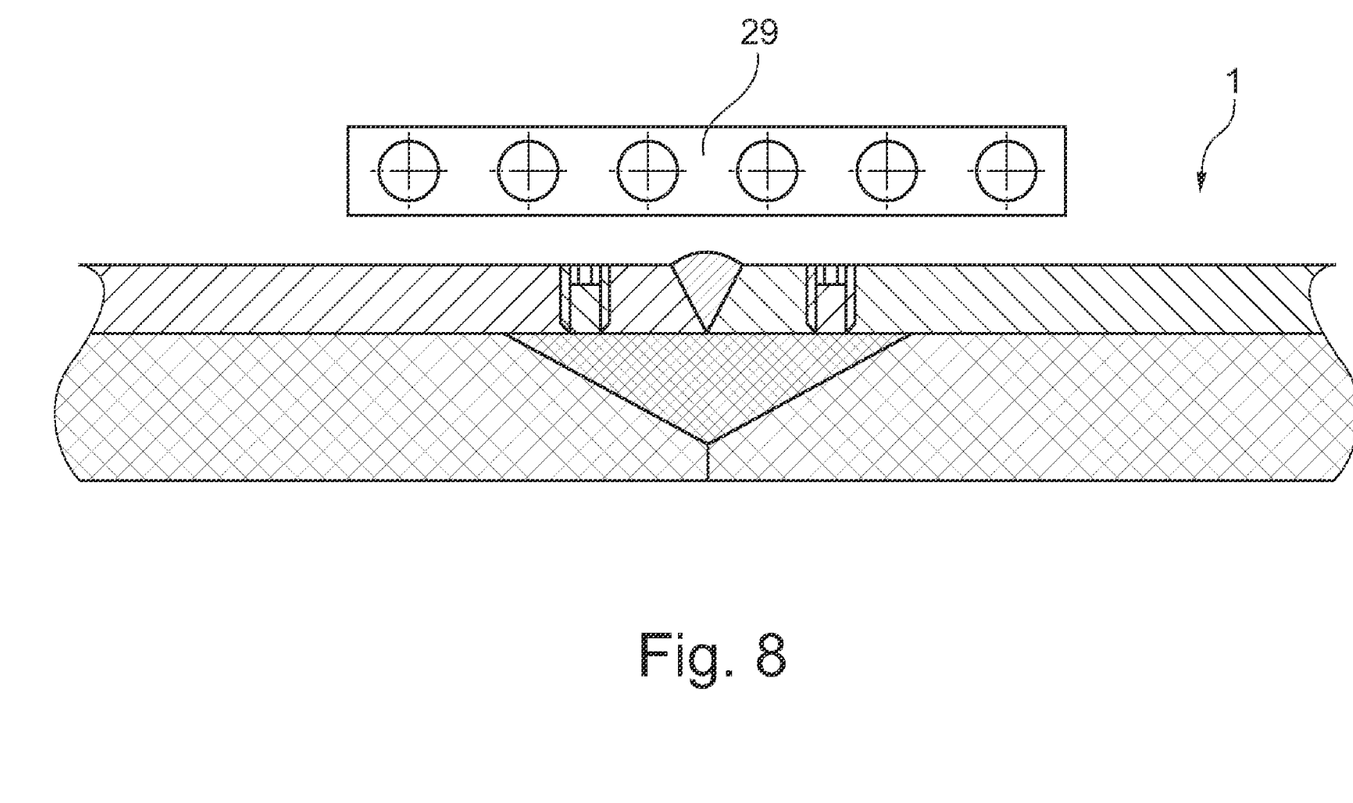
FIG. 8 an illustration of a method step according to the invention.

According to FIG. 8 the material introduced into the fill space 13 after closing the openings is to be tempered by means of an induction heating device 29 arranged externally on the pipe 1 so that the curing process is accelerated.

What is claimed is:

1. A pipeline comprising:
   a first pipe and a second pipe welded together by a weld seam, wherein the first and second pipes each have an inner side with a lining section of plastic material for protecting an inner side of the pipeline;
   wherein the lining sections end at a spacing from the weld seam;
   wherein the lining section of the first pipe abuts the lining section of the second pipe such that by an undercut provided on at least one of the lining sections a fill space is formed in a circumferential direction of the pipeline.

2. The pipeline according to claim 1, comprising a filler material filling out the fill space, wherein the filler material is the same material as the plastic material of the lining sections.

3. The pipeline according to claim 2, wherein the undercut has a profile adapted to create a positive-locking connection between the lining section and the filler material.

4. The pipeline according to claim 1, wherein the lining sections, viewed in a longitudinal direction of the pipeline, have overlapping sections.

5. The pipeline according to claim 1, wherein an inner pipeline cross-section of the pipeline at a transition from the first pipe to the second pipe remains substantially constant.

6. The pipeline according to claim 1, wherein the weld seam is delimited at an inner side of the pipeline by a root weld protection.

7. A method for producing a pipeline provided with a lining, the method comprising the steps of:
   providing individual pipes with a lining section, wherein the lining sections comprise a plastic material and end at a spacing from a pipe end;
   resting the individual pipes end on end against one another so that a fill space is formed by an undercut provided on at least one of the lining sections;
   welding together the individual pipes resting end on end to a pipeline;
   filling the fill space after welding with a filler material that cures or is cured in the fill space.

8. The method according to claim 7, wherein the step of filling is done by casting.

9. The method according to claim 7, wherein filling is done through at least one opening arranged in a wall of the pipeline.

10. The method according to claim 7, further comprising the step of forming the undercut by positioning an appropriately shaped cap on the pipe end during centrifugal casting of the lining section.

11. The method according to claim 7, further comprising the step of applying an adhesive promoter on a part of the lining section forming the undercut for improving the connection between the filler material and the lining section.

12. The method according to claim 7, comprising the step of tempering at least one of the filler material and the lining section.

13. The method according to claim 7, further comprising the step of introducing into the pipeline a support means for at least one of the steps of welding, filling, and curing of the filler material.

14. The method according to claim 7, further comprising the step of effecting during welding heat dissipation by arranging a heat dissipation means externally on the pipes.

* * * * *